(12) United States Patent
Lee

(10) Patent No.: US 8,770,243 B2
(45) Date of Patent: Jul. 8, 2014

(54) BICYCLE TIRE

(75) Inventor: Sung Yull Lee, Busan (KR)

(73) Assignee: Fine Chemical Co., Ltd. (KR)

( * ) Notice: Subject to any disclaimer, the term of this patent is extended or adjusted under 35 U.S.C. 154(b) by 266 days.

(21) Appl. No.: 13/348,744

(22) Filed: Jan. 12, 2012

(65) Prior Publication Data

US 2012/0111468 A1 May 10, 2012

Related U.S. Application Data

(63) Continuation of application No. PCT/KR2010/001405, filed on Mar. 5, 2010.

(30) Foreign Application Priority Data

Jul. 22, 2009 (KR) .................. 10-2009-0066905

(51) Int. Cl.
*B60C 19/00* (2006.01)

(52) U.S. Cl.
USPC ........................................ 152/385; 152/379.3

(58) Field of Classification Search
USPC ............ 152/375, 378 R, 379.3, 379.4, 379.5, 152/382, 385
See application file for complete search history.

(56) References Cited

U.S. PATENT DOCUMENTS 1,395,206 A * 10/1921 Parham .................. 152/382

FOREIGN PATENT DOCUMENTS

JP       2007-170289      *  6/2007

* cited by examiner

*Primary Examiner* — S. Joseph Morano
*Assistant Examiner* — Jean Charleston
(74) *Attorney, Agent, or Firm* — Park & Associates IP Law, P.C.

(57) ABSTRACT

The present invention relates to a bicycle tire. More particularly, the bicycle tire is formed by foaming synthetic resin materials and is mounted to a rim of a bicycle, wherein the tire is prevented from being unexpectedly separated from the rim in use. That is, the bicycle tire formed by injection-foam molding is characterized in that: a rim coupling portion of the bicycle tire is formed with a plurality of coupling holes at predetermined intervals; and stoppers formed of synthetic resin materials are fixed in the coupling holes, stopped by annular holding protrusions when the tire is mounted to the bicycle rim, and formed of arch surfaces, horizontal surfaces and tilted both end surfaces so that the tilted both end surfaces are protruded when the stoppers are fixed to the coupling holes.

3 Claims, 3 Drawing Sheets

BICYCLE TIRE

REFERENCE TO RELATED APPLICATIONS

This is a continuation of pending International Patent Application PCT/KR2010/001405 filed on Mar. 5, 2010, which designates the United States and claims priority of Korean Application No. 10-2009-0066905 filed on Jul. 22, 2009, the entire contents of which are incorporated herein by reference.

FIELD OF THE INVENTION

The present invention relates to a bicycle tire, and more particularly, to a bicycle tire, which is formed by foaming synthetic resin materials and is mounted to a rim of a bicycle, wherein the tire is prevented from being unexpectedly separated from the rim in use.

BACKGROUND OF THE INVENTION

Recently, with the spread of awareness on eco-friendly and low carbon materials, urban bicycles and mountain bicycles have been widely spread, and the generally used bicycles with built-in tubes have several inconveniences in that they are highly concerned about puncture and in that users have to pump air into the tires because of a leakage of air injected into the tubes as time passes.

Moreover, in the case of the mountain bicycles, the users may experience heavy discomfort because there is no way to properly cope with puncture of the tire when it has a puncture because the mountain bicycles run in a mountain area spaced apart from a downtown area, and hence, development of a bicycle tire which can prevent the puncture is in desperate need.

In the meantime, recently, bicycle tires that are formed by injection-molding and foaming synthetic resin materials, such as polyurethane, with elasticity and durability have been disclosed. Such bicycle tires can prevent a puncture of the tires during running and are lightweight and economical.

However, if an impact is eccentrically applied to the right or left direction during running in a state where the tire is mounted on a rim of the bicycle, a rim fixing part of the tire may be separated from the rim, and it may cause the incidence of safety accidents, and hence, development of bicycle tires, which can solve such a problem, is urgently needed.

SUMMARY OF THE INVENTION

Accordingly, the present invention has been made in an effort to solve the above-mentioned problems occurring in the prior arts, and it is an object of the present invention to provide a bicycle tire, which is prevented from being separated from the rim even though an external impact is applied to the rim in a state where the tire manufactured by one of various foaming methods is mounted on the rim, and which is comfortable to drive on the floor surface where the tire is grounded.

To achieve the above objects, the present invention provides a bicycle tire including: coupling holes formed in a rim coupling portion of the tire at predetermined intervals; and stoppers forcedly fit to the coupling holes, protruding to both ends of the coupling holes, and being stopped by annular holding protrusions when the tire is mounted to the bicycle rim.

According to the bicycle tire of the present invention, because the stoppers are maintained to be held by the annular holding protrusions when the tire is mounted to the bicycle rim, the bicycle tire can be prevented from being unexpectedly separated from the rim by an external impact applied during running to thereby reduce the incidence of safety accidents during running.

DETAILED DESCRIPTION OF THE INVENTION

Figure 1:
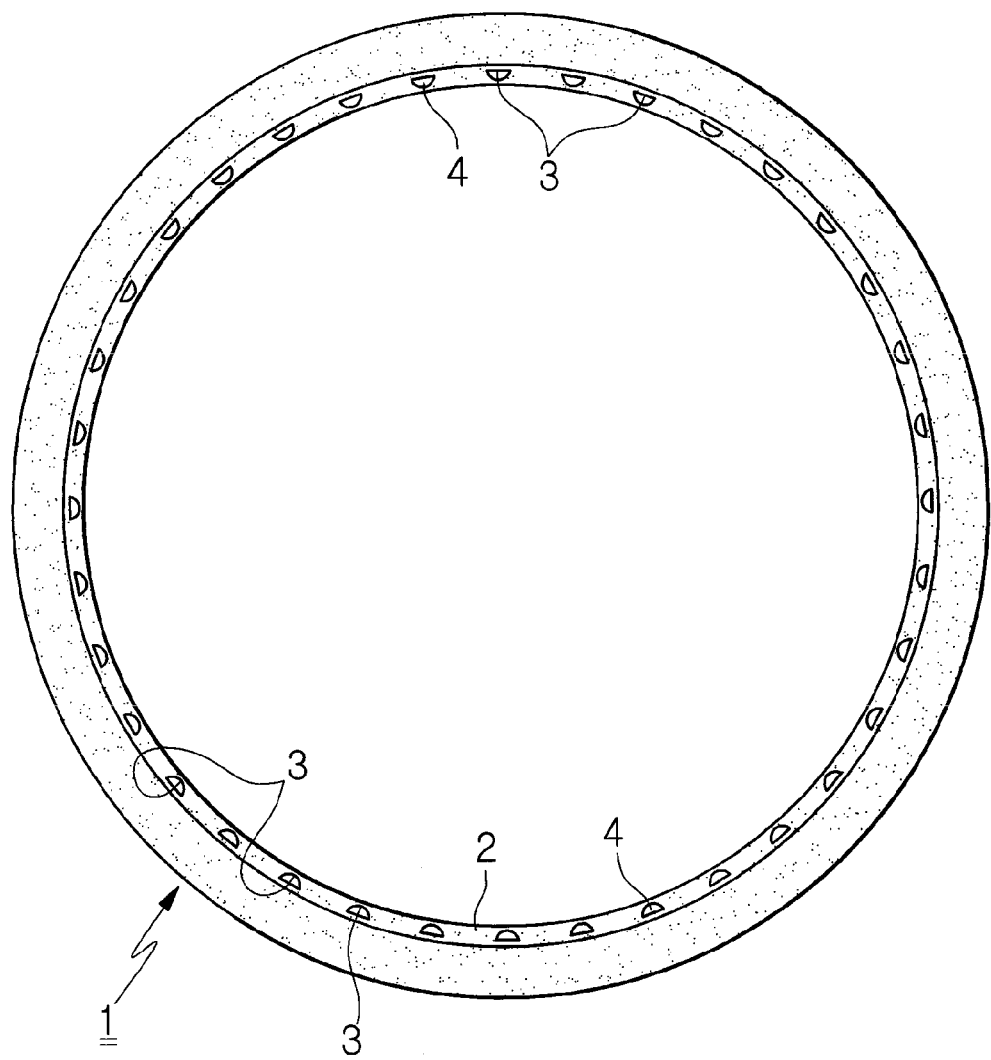
FIG. 1 is a front view showing a structure of a bicycle tire according to the present invention.
Figure 2:
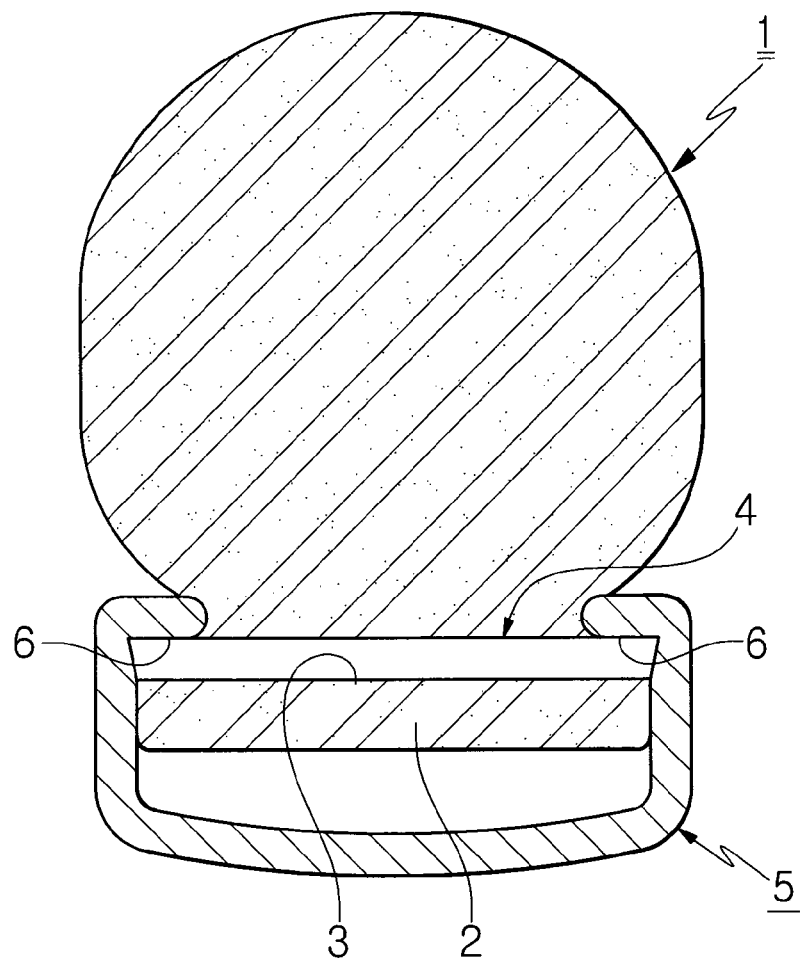
FIG. 2 is an enlarged sectional view showing a state where the bicycle tire is mounted to the bicycle rim.
Figure 3:
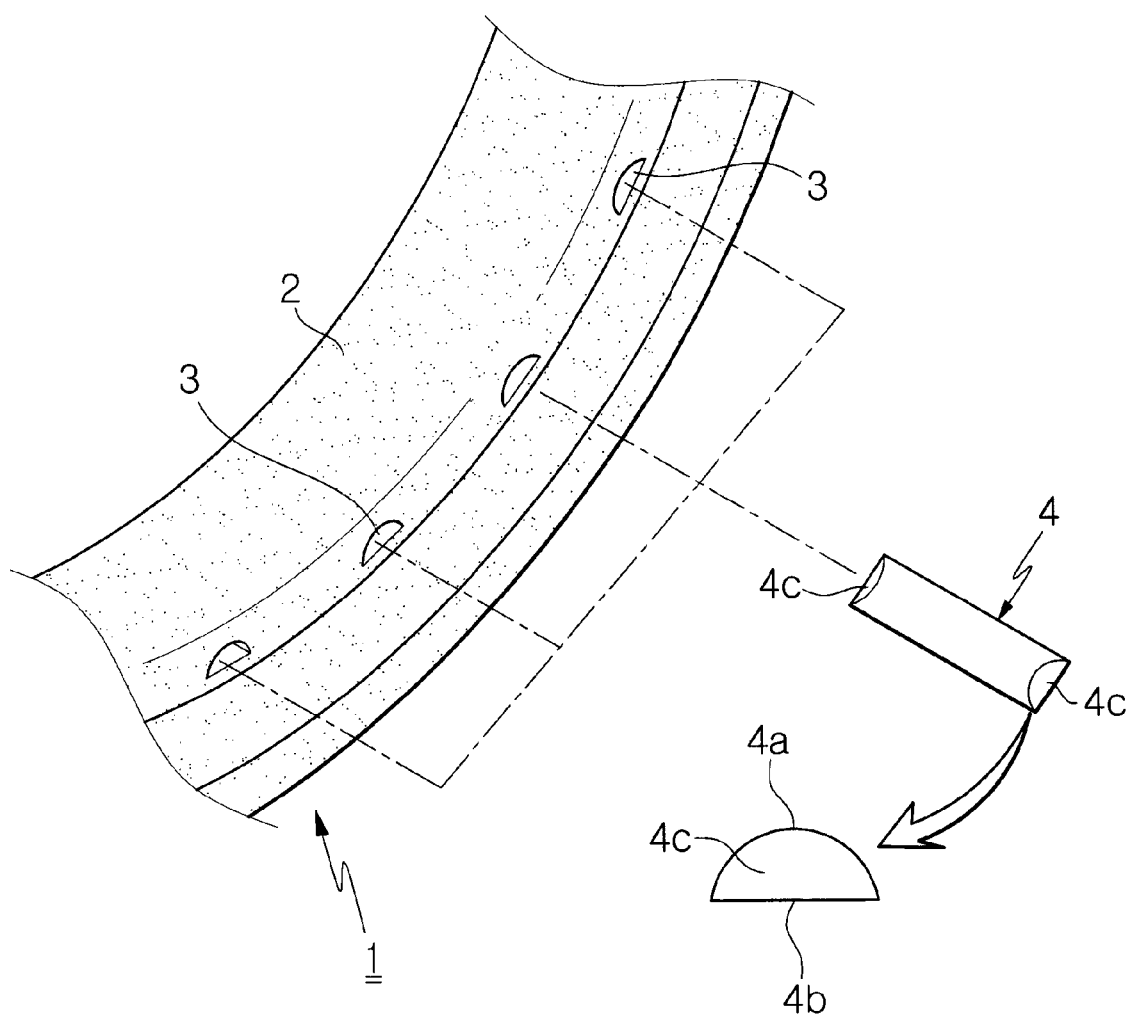
FIG. 3 is an exploded perspective view of stoppers fixed in coupling holes of the bicycle tire.

Reference will be now made in detail to a bicycle tire 1 of the present invention with reference to the attached drawings. FIG. 1 is a front view showing a structure of a bicycle tire according to the present invention, FIG. 2 is an enlarged sectional view showing a state where the bicycle tire is mounted to the bicycle rim, and FIG. 3 is an exploded perspective view of stoppers fixed in coupling holes of the bicycle tire.

The bicycle tire 1 manufactured by injection-foam molding includes: a plurality of coupling holes 3 formed in a rim coupling portion 2 of the bicycle tire 1 at predetermined intervals; and stoppers 4 formed of synthetic resin materials and forcedly fit to the coupling holes 3 so that the stoppers 4 are stopped by annular holding protrusions 6 and can keep a firm mounted state when the bicycle tire 1 is mounted to the bicycle rim.

That is, the rim coupling portion 2 of the tire 1 has the annular holding protrusions formed on the inner circumference thereof and is retained to the rim 5. Moreover, the rim coupling portion 2 has the coupling holes 3 of a half-moon shape formed at the predetermined intervals, and the stoppers 4 respectively having a half-moon shaped section in such a fashion are forcedly fit to the coupling holes 3.

The stoppers 4 of the half-moon shape somewhat protrude from both sides of the coupling holes 3 when the stoppers 3 are mounted in the coupling holes 3. Each of the stoppers 4 includes an arc-shaped surface 4a, a horizontal surface 4b, and both tilted end surfaces 4c ranging from the arc-shaped surface 4a and the horizontal surface 4b, so that the stoppers 4 are smoothly fixed to the rim 5 but are not unexpectedly separated from the rim during running.

As described above, because the stoppers 4 are maintained to be held by the annular holding protrusions 6 when the tire 1 is mounted to the bicycle rim 5, the bicycle tire 1 can be prevented from being unexpectedly separated from the rim 5 by an external impact applied during running to thereby reduce the incidence of safety accidents during running. In order to mount the tire 1 to the rim 5, when the inner circumference of the rim coupling portion 2 gets in contact with the outer circumference of the rim 5 and the rim coupling portion 2 is pushed in toward the central direction of the rim 5, because the rim coupling portion 2 that is formed by foaming synthetic resin materials, the rim coupling portion 2 is introduced into the rim 5 and retained and fixed to the annular holding protrusions 6 while being compressed. When both tilted end surfaces 4c formed at both end portions of the stoppers 4 are introduced into the annular holding protrusions 6 while being bent along the annular holding protrusions 6 of the rim 5, the stoppers 4 fixed in the coupling holes 3 of the rim coupling portion 2 are restored to the original state and the horizontal surfaces 4b are stopped by the annular holding protrusions 6 in such a ways as not to be unexpectedly separated, so that the tire can run in safety because the plural stoppers 4 hold the ring holding portion 2 stably even though the tire 1 has an impact by the external force.

While the present invention has been described with reference to the particular illustrative embodiment, it is not to be restricted by the embodiments but only by the appended claims. It will be understood that the exemplary embodiment of the present invention is to cover all modifications, equivalents, and alternatives falling within the claims of the present invention.

The bicycle tire according to the present invention can be used not only to urban bicycles, leisure bicycles, and mountain bicycles but also to small-sized vehicle tires, and hence, has a key part in development of the relevant industries.

What is claimed is:

1. A bicycle wheel comprising:
   a tire including an outer annular portion, and a rim coupling portion at an inner area of the outer annular portion, said rim coupling portion having a plurality of coupling holes formed there-through;
   an annular rim formed of rigid materials, the annular rim including an inner annular wall portion, two side wall portions, and two outer protrusions extending transversely from the two side wall portions toward each other, with an annular channel defined in an interior area of the inner annular wall portion, the two side wall portions, and the two outer protrusions; and
   a plurality of stoppers of synthetic resin materials, each stopper having a bar shape of generally semi-circular cross-section with an semi-circular or curved upper surface, a generally planar bottom surface, and two opposing end surfaces of slanted face angled toward the generally planar bottom surface of the stopper,
   wherein said stoppers are inserted through the coupling holes of the rim coupling portion with the semi-circular or curved upper surface facing toward a center of the annular rim, and wherein an overall length between the two opposing end surfaces of the stopper is longer than a length of the coupling holes of the tire such that the stoppers inserted through the coupling holes protrude from the coupling holes to lock in the annular channel of the annular rim when the tire is coupled to the annular rim.

2. The bicycle wheel of claim 1, wherein the tire is formed of resin materials by injection molding.

3. The bicycle wheel of claim 1, wherein the tire is assembled to the annular rim with each of the stoppers bent to reduce its length as the stopper protruded from the coupling hole is pressed against the two outer protrusions of the annular rim for assembling, and the stopper restores its original shape after assembling into the annular rim.

* * * * *